(12) United States Patent  
Gupta et al.

(10) Patent No.: US 8,675,833 B2  
(45) Date of Patent: Mar. 18, 2014

(54) SYSTEM AND METHOD FOR MANAGING MESSAGES

(75) Inventors: Shekhar Gupta, Overland Park, KS (US); Mike Roberts, Overland Prk, KS (US); Blaine Smith, Overland Park, KS (US)

(73) Assignee: CentruryLink Intellectual Property LLC, Denver, CO (US)

( * ) Notice: Subject to any disclaimer, the term of this patent is extended or adjusted under 35 U.S.C. 154(b) by 913 days.

(21) Appl. No.: 12/256,322

(22) Filed: Oct. 22, 2008

(65) Prior Publication Data

US 2010/0098226 A1    Apr. 22, 2010

(51) Int. Cl.
  *H04M 1/64*    (2006.01)
(52) U.S. Cl.
  USPC ................................. 379/88.22; 379/88.19
(58) Field of Classification Search
  USPC .......................................... 379/88.11–88.23
  See application file for complete search history.

(56) References Cited

U.S. PATENT DOCUMENTS

| | | | | |
|---|---|---|---|---|
| 4,916,726 A * | 4/1990 | Morley et al. | ............... | 379/88.13 |
| 6,317,777 B1 * | 11/2001 | Skarbo et al. | ................. | 709/204 |
| 6,335,962 B1 * | 1/2002 | Ali et al. | ..................... | 379/88.11 |
| 6,421,545 B1 * | 7/2002 | Christal | ........................ | 455/566 |
| 7,194,611 B2 * | 3/2007 | Bear et al. | .......................... | 713/1 |
| 7,221,742 B1 * | 5/2007 | Baker et al. | ................. | 379/88.23 |
| 2003/0039342 A1 * | 2/2003 | Yafuso | ........................ | 379/88.19 |
| 2005/0033780 A1 * | 2/2005 | Simelius et al. | .............. | 707/204 |
| 2007/0185962 A1 * | 8/2007 | Bocking et al. | ............... | 709/206 |
| 2007/0286358 A1 * | 12/2007 | Pomerantz et al. | .......... | 379/67.1 |
| 2008/0200151 A1 * | 8/2008 | Lohr | ............................ | 455/413 |
| 2009/0154668 A1 * | 6/2009 | Hao et al. | ................... | 379/88.18 |
| 2009/0290690 A1 * | 11/2009 | Fan et al. | ................... | 379/88.13 |

* cited by examiner

*Primary Examiner* — Duc Nguyen  
*Assistant Examiner* — Assad Mohammed  
(74) *Attorney, Agent, or Firm* — Patton Boggs LLP (57) ABSTRACT

A system and method for managing messages, such as, but not limited to, voicemails and text messages, is presented. For example, in one embodiment, the method includes identifying a caller associated with a message for a callee. The method determines whether at least one other new message for the callee is from the caller. In response to at least one other new message for the callee is from the caller, the method groups the message with the at least one other new message.

14 Claims, 6 Drawing Sheets

SYSTEM AND METHOD FOR MANAGING MESSAGES

BACKGROUND

Currently, the majority of users retrieve remote voicemails by manually calling a voicemail server controlled by a network operator. The voicemail server generates a synthetic voice announcing the number of stored messages to the user and then sequentially replays the stored messages. Further, if a user desires to delete and/or replay a message, the user must manually enter the correct input, such as, "press 3 to reply" and "press 7 to delete". This process does not allow a user to quickly retrieve a desired voicemail, especially if there are numerous stored voice messages prior to the desired voicemail.

Some service providers have introduced visual voicemail as alternative to the above process. Visual voicemail adds a visual aspect to phone voicemail by displaying information about a stored voicemail, such as, a caller's name, the calling number, the time of the call, and the length of the message. Further, visual voicemail allows users to listen to their messages in the order of their choice. Additionally, some visual voicemail applications convert a received voicemail into text using speech recognition software to enable a user to view the voicemail as a text message.

SUMMARY

Embodiments of the present invention include a system and method for managing messages. In one embodiment, a method, performed by a messaging system, for managing messages is presented. The method includes identifying a caller associated with a message for a callee. The method determines whether at least one other new message for the callee is from the caller. In response to at least one other new message for the callee is from the caller, the method groups the message with the at least one other new message. For example, in one embodiment, all messages, such as, but not limited to, voicemails and/or text message, received by the callee from the same caller are grouped together.

In another embodiment, a method for managing voicemail messages is presented. The method includes identifying a caller associated with a voicemail message for a user. The method determines whether a user created rule is associated with the caller. In response to a user created rule being associated with the caller, the method performs the actions specified by the user created rule to the voicemail message. For example, in one embodiment, a user created rule may be created for filtering all voicemails received from a user's workplace to a specified folder to enable the user to quickly identify and retrieve these particular messages.

BRIEF DESCRIPTION OF THE DRAWINGS

For a more complete understanding of the present application, the objects and advantages thereof, reference is now made to the following descriptions taken in conjunction with the accompanying drawings, in which.

DETAILED DESCRIPTION OF THE DRAWINGS

Although, visual voicemail has improved upon the sequential dial-in voicemail systems, the disclosed embodiments recognize that both visual voicemail applications and the standard dial-in voicemail systems lack the ability for a user to automatically organize the messages, such as, but not limited to, messages from a particular caller or group of callers, and further lacks that ability for a user to efficiently select and play all messages from a particular caller or group of callers. For example, suppose a user receives numerous personal and work-related voicemails each day. Using the standard dial-in voicemail systems, the user would have to listen sequentially to each voicemail until an important work-related voicemail is played. Using visual voicemail, the user would have to scroll through the list of voicemails and select each work related voicemail individually, assuming that the user notices all the work related voicemails. Thus, certain of the disclosed embodiments provide a system and method for managing messages that may overcome one or more of the recognized disadvantages of the current systems.

The disclosed embodiments and advantages thereof are best understood by referring to FIGS. 1-6 of the drawings, like numerals being used for like and corresponding parts of the various drawings. Other apparatus features and advantages of the disclosed embodiments will be or will become apparent to one of ordinary skill in the art upon examination of the following figures and detailed description. It is intended that all such additional apparatus, features and advantages be included within this description, be within the scope of the disclosed embodiments, and be protected by the accompanying drawings.

Figure 1:
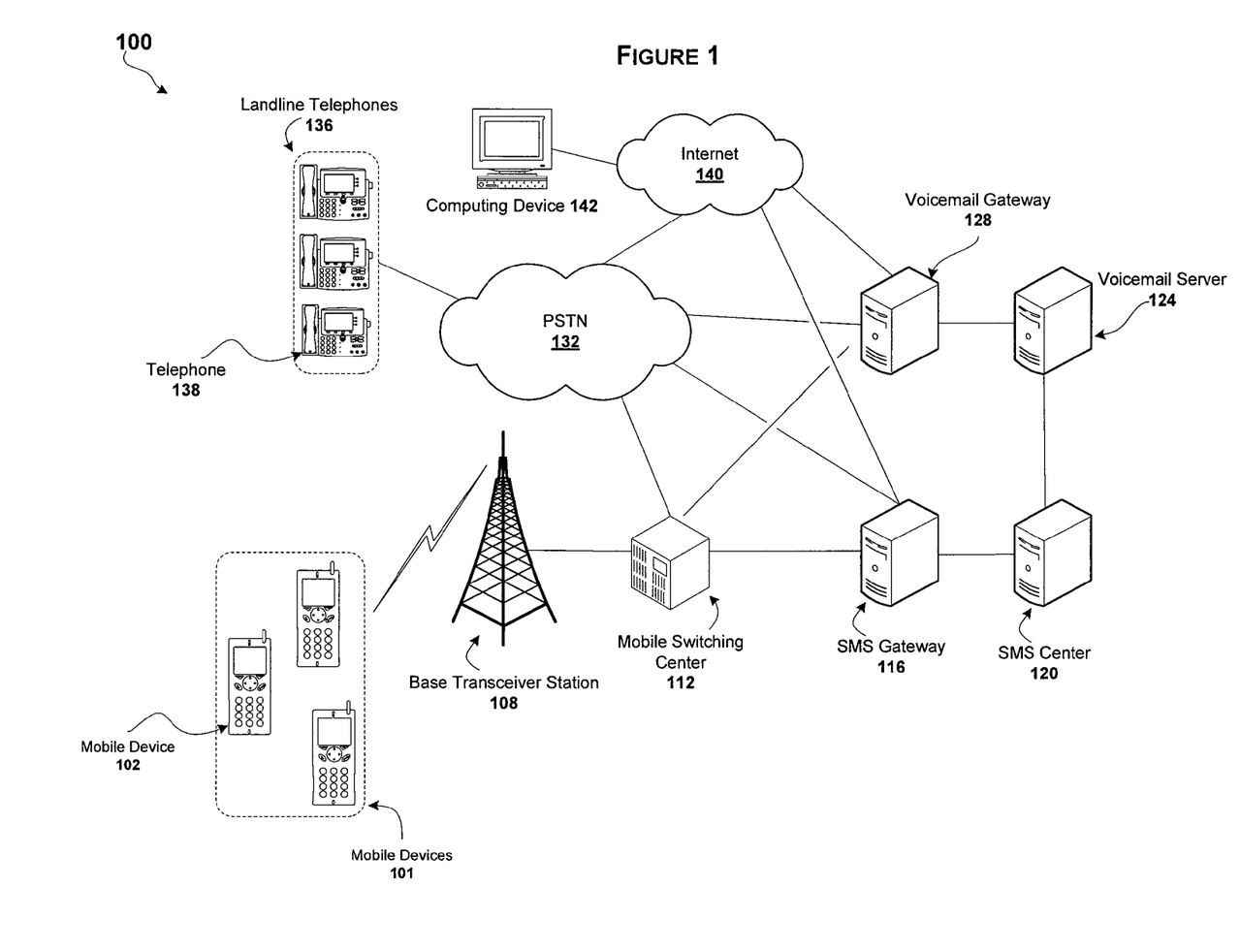
FIG. 1 depicts an embodiment of a network environment in which the illustrative embodiments may be implemented.
Figure 2:
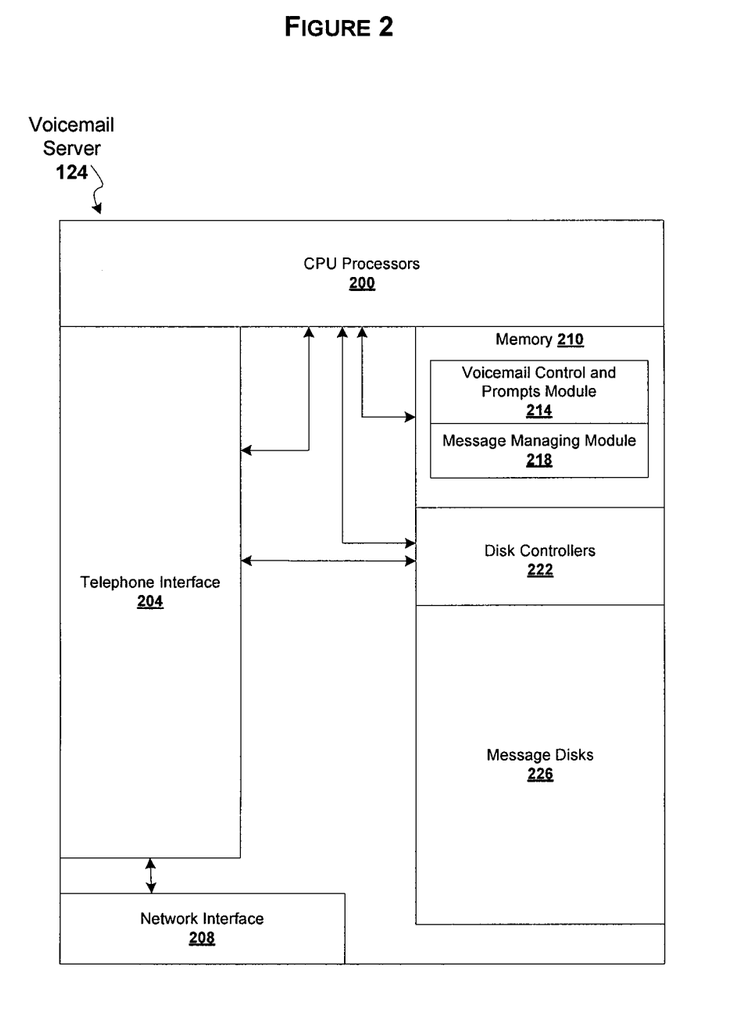
FIG. 2 depicts an embodiment of a data processing system in which the illustrative embodiments may be implemented.

With reference now to the figures and in particular with reference to FIGS. 1 and 2, exemplary diagrams of a network environment and a data processing system are provided in which illustrative embodiments may be implemented. It should be appreciated that FIGS. 1 and 2 are only exemplary and are not intended to assert or imply any limitation with regard to the environments and/or architecture in which different embodiments may be implemented. Many modifications to the depicted environment/architecture may be made.

FIG. 1 depicts a network environment 100 in which the illustrative embodiments may be implemented for managing messages, such as, but not limited to, voicemail messages and/or short message service (SMS) text messages. In the depicted embodiment, mobile devices 101, including mobile device 102, communicate wirelessly with a base transceiver station 108. Mobile devices 101 are hand-held computing and/or communication devices, such as, but not limited to, cellular phones and personal digital assistants (PDAs). Mobile devices 101 may be used to communicate with other mobile devices and/or computing devices, such as, but not limited to, landline telephones 136 and computing device 142, over network environment 100. In some embodiments, mobile devices 101 may also have wireless internet capability to communicate with other mobile devices and/or computing devices over Internet 140. Additionally, in some embodiments, mobile devices 101 may be used to send and receive faxes, email, and text messages.

Base transceiver station 108 is a piece of equipment that facilitates wireless communication between mobile devices 101 and a mobile switching center, such as, but not limited to, mobile switching center 112. The primary function of base transceiver station 108 is to maintain the air interface, or medium, for communication to any mobile device within its cell, such as, but not limited to, mobile device 102.

Mobile devices 101 are associated with special codes/identifiers that are used to identify a particular mobile device, such as, mobile device 102. In some embodiments, the special codes/identifiers are also user to identify a service provider associated with a particular mobile device. Additionally, in some embodiments, the special codes/identifiers may also be used to identify an owner associated with a particular mobile device.

In some embodiments, mobile devices 101 transmit a registration request that includes the special codes/identifiers to mobile switching center 112 via base transceiver station 108. Mobile switching center 112 uses the data from the registration request to determine the location/cellular sub-system to route communications/calls to mobile devices 101. In addition, in the depicted embodiment, mobile switching center 112 may communicate with short message service gateway 116 (SMS gateway 116), PSTN 132, and/or voicemail gateway 128 for handling voice calls and SMS messaging as well as other services.

SMS gateway 116 is a network element in network environment 100 which sends and receives SMS messages, i.e., text message, between the various networks, such as, but not limited to, PSTN 132 and Internet 140. For example, in one embodiment, SMS Gateway 116 is used to communicate SMS messsages between SMS center 120 and another SMS center (SMSC) that utilizes a different communication protocol for SMS messaging than SMS center 120.

SMS center 120 is responsible for handling the SMS operations of network environment 100. For example, in one embodiment, when an SMS message is sent from mobile device 102, the SMS message is transmitted to SMS center 120. SMS center 120 routes the SMS message to the intended destination device. In some embodiments, an SMS message may need to pass through more than one network entity (e.g. SMSC and SMS gateway) before reaching the intended destination device. Additionally, in some embodiments, if the intended destination device is unavailable (for example, when the mobile phone is switched off), SMS center 120 stores the SMS message and forwards the SMS message when the recipient is available.

In the depicted embodiment, mobile switching center 112 may also communicate with PSTN 132. PSTN 132 is the world's collection of interconnected voice-oriented public telephone networks. The public circuit-switched telephone networks are connected together by trunks (i.e., analog and/or digital phone lines). PSTN 132 routes calls by creating a path from one network to another for the duration of each call. For example, in one embodiment, PSTN 132 routes calls to and from landline telephones 136 by using a routing table that contains the pre-defined routes for a connection.

Additionally, in some embodiments, Internet 140 may be communicatively coupled to PSTN 132 for routing voice calls and SMS messages between different communication devices in network environment 100. For example, in some embodiments, an SMS message may be sent from mobile device 102 to computing device 142.

In addition, network environment 100 may include one or more voicemail gateways, such as, but not limited to, voicemail gateway 128. Voicemail gateway 128 is similar to SMS gateway 116 in that voicemail gateway 128 enables voicemail server 124 to communicate with other components of network environment 100 that may utilize different communication protocols. For example, in one embodiment, voicemail gateway 128 enables voicemail server 124 to connect to an IP telephony solution network.

Voicemail server 124 handles the voice messaging services of network environment 100. In general, in some embodiments, voicemail server 124 records, stores, and plays voice messages using specified user-prompts. Additionally, in some embodiments, voicemail server 124 notifies a respective telecommunication device, such as, but not limited to, mobile device 102 or telephone 138, that a new voicemail has been received. For example, currently, a user of mobile device 102 and/or network telephone 138 may be notified of a new voicemail by causing a light to blink on the telecommunication device and/or by providing a visual indication that a new voicemail has been received. However, the current notification methods do not provide a user an efficient method to quickly identify and retrieve all messages from a particular caller and/or group of callers.

Therefore, in accordance with one embodiment, a method performed by a messaging system for managing messages in a more efficient manner is presented. In one embodiment, the messaging system may be a voicemail server, such as, but not limited to, voicemail server 124. Alternatively, in some embodiments, the messaging system may be the actual recipient device, such as, but not limited to, mobile devices 101, landline telephones 136, and/or computing device 142. Further, in other embodiments, the messaging system may be a separate component of network environment 100 capable of performing the disclosed embodiments.

FIG. 2 illustrates an embodiment of a data processing system, such as, but not limited to, voicemail server 124, that may be used for managing messages in accordance with one embodiment of the present invention. In the depicted embodiment, voicemail server 124 includes CPU processors 200, telephone interface 204, network interface 208, memory 210, disk controllers 222, and message disks 226.

CPU processors 200 consist of numerous microprocessors for handling vast amounts of data simultaneously. For example, in one embodiment, CPU processors 200 executes instructions associated with voicemail control and prompts module 214 stored in memory 210 for handling numerous voice calls, received from telephone interface 204 and/or network interface 208, at the same time. For instance, voicemail server 124 may retrieve messages for a network telephone user, while also recording new messages received from other devices.

In one embodiment, the recorded messages are stored in message disks 226 of voicemail server 124. Message disks 226 may comprise of one or more data storage units. In some embodiments, CPU processors 200 uses disk controllers 222 to retrieve a particular stored message from message disks 226.

In accordance with one embodiment, memory 210 also includes message managing module 218. In some embodiments, message managing module 218 identifies a caller associated with a message for a callee. For example, in some embodiments, message managing module 218 may use caller identification technology to determine the phone number, an IP address, and/or the name of a person associated with the device that is initiating the call (i.e., the caller). Message managing module 218 determines whether at least one other new message for the callee is from the caller. For example, in some embodiments, message managing module 218 may maintain a data table comprising caller identifications associated with all new messages. In response to at least one other new message for the callee is from the caller, message managing module 218 groups the message with the at least one other new message. As referenced herein, the term "group," "grouping," and/or "groups" includes physically grouping the messages in a data storage device, storing the messages in the same directory/folder, and/or associating the messages together in some other manner, such as, but not limited to storing pointers to the messages in an array or link-list. As an example, in some embodiments, all messages received from the same telephone number are automatically grouped together. As another example, in some embodiments, all messages received from the same identified person, whether from the same device or from different devices (e.g., home, cell, and/or work number associated with the same person) are automatically grouped together.

In some embodiments, message managing module 218 may also be used to manage text messages either on voicemail server 124, SMS center 120, and/or on another data processing system. In these embodiments, text messages may be grouped with voicemail messages and/or may be grouped separately from voicemail messages. Further, in some embodiments, message managing module 218 increments a count associated with a number of new messages (text and/or voice messages) from the caller that are stored for the callee.

In addition, in some embodiments, message managing module 218 sends message data to a communication device associated with the callee to display the caller identification along with the number of new messages associated with the particular caller on a display of the communication device. Further, in some embodiments, the message data may differentiate between the number of voice messages and text messages that are associated with the particular caller. For example, in one embodiment, the communication device may display "CallerID: # VMS, # SMS." Additionally, in some embodiments, the user may expand the group of messages to display the details associated with each new message, such as, but not limited to, the time/date of the call and the length of the message. In some embodiments, a user may select a particular message to playback/view and/or may view/playback all messages for a certain group. In addition, other options may be available, such as, but not limited to, deleting or forwarding an entire group of messages.

However, in some embodiments, even if the telecommunication device is not capable of visually displaying the grouping of messages, a user may call the messaging system (e.g., voicemail server 124) to retrieve the messages. In these embodiments, voicemail server 124 using voicemail control and prompts module 214 and message managing module 218 announces to the user/caller the caller identification associated with a group of messages and the corresponding number of messages. Voicemail server 124 enables a user to select and play a particular group of messages. For example, a user calling his voicemail may be greeted with the following, "You have 3 messages from Brian, 2 messages from Kevin, 2 messages from an unknown number, 1 message from 2148723222, and 4 messages from John Smith (e.g., your boss)." In some embodiments, a user may verbally announce and/or enter a particular key to listen to just the 4 messages from John Smith and ignore the rest of the messages for the time being. Additionally, in some embodiments, additional details may be provided about the individual messages within a group of messages to enable selection of a particular message. Thus, the disclosed embodiments enable a user to retrieve a particular message and/or group of messages more effeciently than the current methods of retrieving messages.

In another embodiment for managing voicemail messages, voicemail server 124 identifies a caller associated with a voicemail message and determines whether a user created rule is associated with the caller. If a user created rule is associated with the caller, voicemail server 124 performs the actions specified by the user created rule to the voicemail message. For example, in some embodiments, a user created rule may specify that any messages received from a caller having a phone number that matches the following string 214-259-####, where # may be any number, should be grouped together in a "Work" folder. Thus, a user may quickly identify all work related voicemails. Further, in some embodiments, the user created rule may create subfolders within the Work folder for grouping all messages from a particular group of extensions, such as, but not limited to, 214-259-55## (e.g., calls from the accounting department). Additionally, in some embodiments, a user may create a rule for grouping all messages received from a list of user specified phone numbers, such as, but not limited to, all phone numbers associated with family members. Other examples of user created rules may include, but are not limited to, grouping all messages received from a particular geographical location, such as, but not limited to, a particular city, county, state, and/or country. Similar to the previous embodiments, the user may be notified of the new messages on a communication device associated with the user and an action, such as, but not limited to, playing all and/or providing additional information about each message within a group of messages may be performed.

As will be further described below, in some embodiments, the user may create the user created rule via a message application executed on a telecommunication device. Alternatively or in addition to, in some embodiments, a user may create the user created rule via the Internet using a web portal/page associated with a service provider of the voicemail system.

Figure 3:
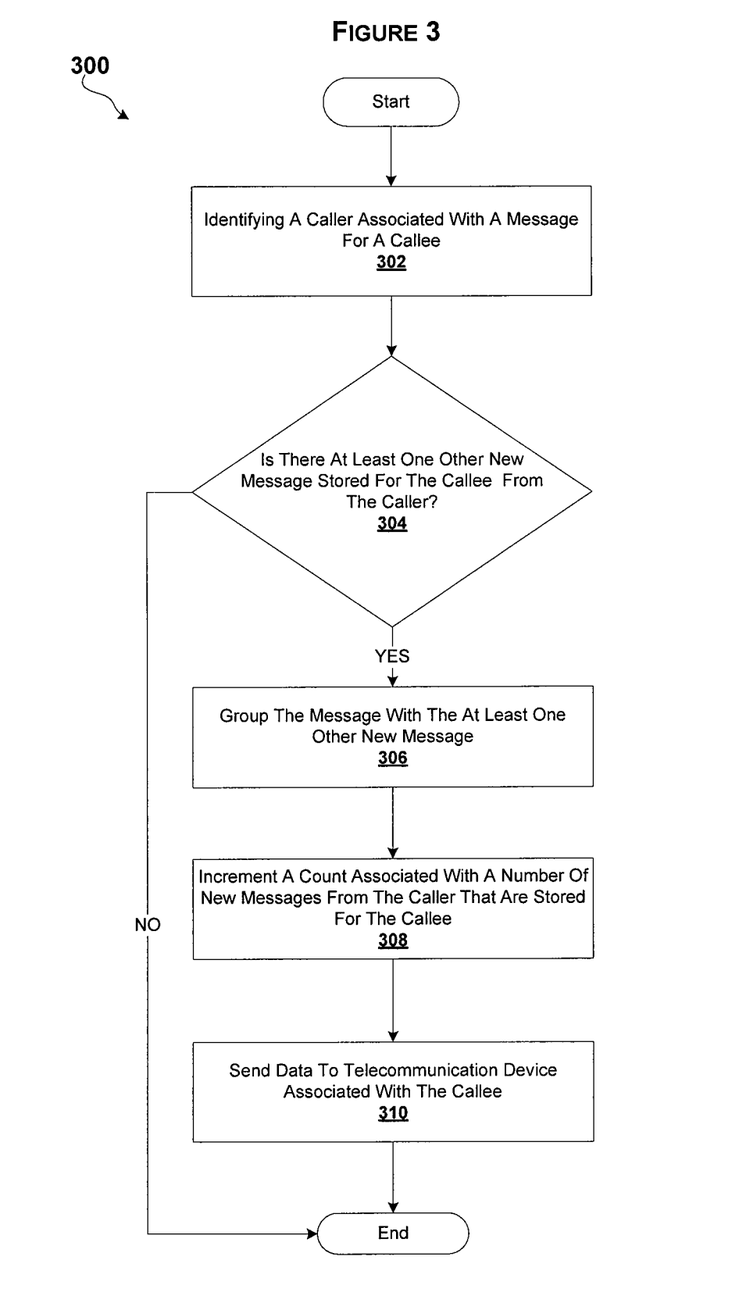
FIG. 3 depicts an embodiment of a process performed by a messaging system for managing messages.

FIG. 3 depicts an embodiment of a process 300 performed by a messaging system for managing messages. Process 300 begins, at step 302, by identifying a caller associated with a message for a callee. At step 304, the process determines whether at least one other new message stored for the callee is from the caller. If the there does not exist at least one other new message for the callee that is from the caller, the process stores the message as usual and terminates process 300. However, in reponse to at least one other new message for the callee is from the caller, the process, at step 306, groups the message with the at least one other new message. The process increments a count associated with a number of new messages from the caller that are stored for the callee at step 308. The process then sends the data to a telecommunication device associated with the callee at step 310, with process 300 terminating thereafter. As previously stated, the messaging system may be a remote data processing system, such as, but not limited to, voicemail server 124. Alternatively, in some embodiments, process 300 may be performed locally by a telecommunication device (e.g., the intended recipient device). In these embodiments, step 310 may be ommitted.

Figure 4:
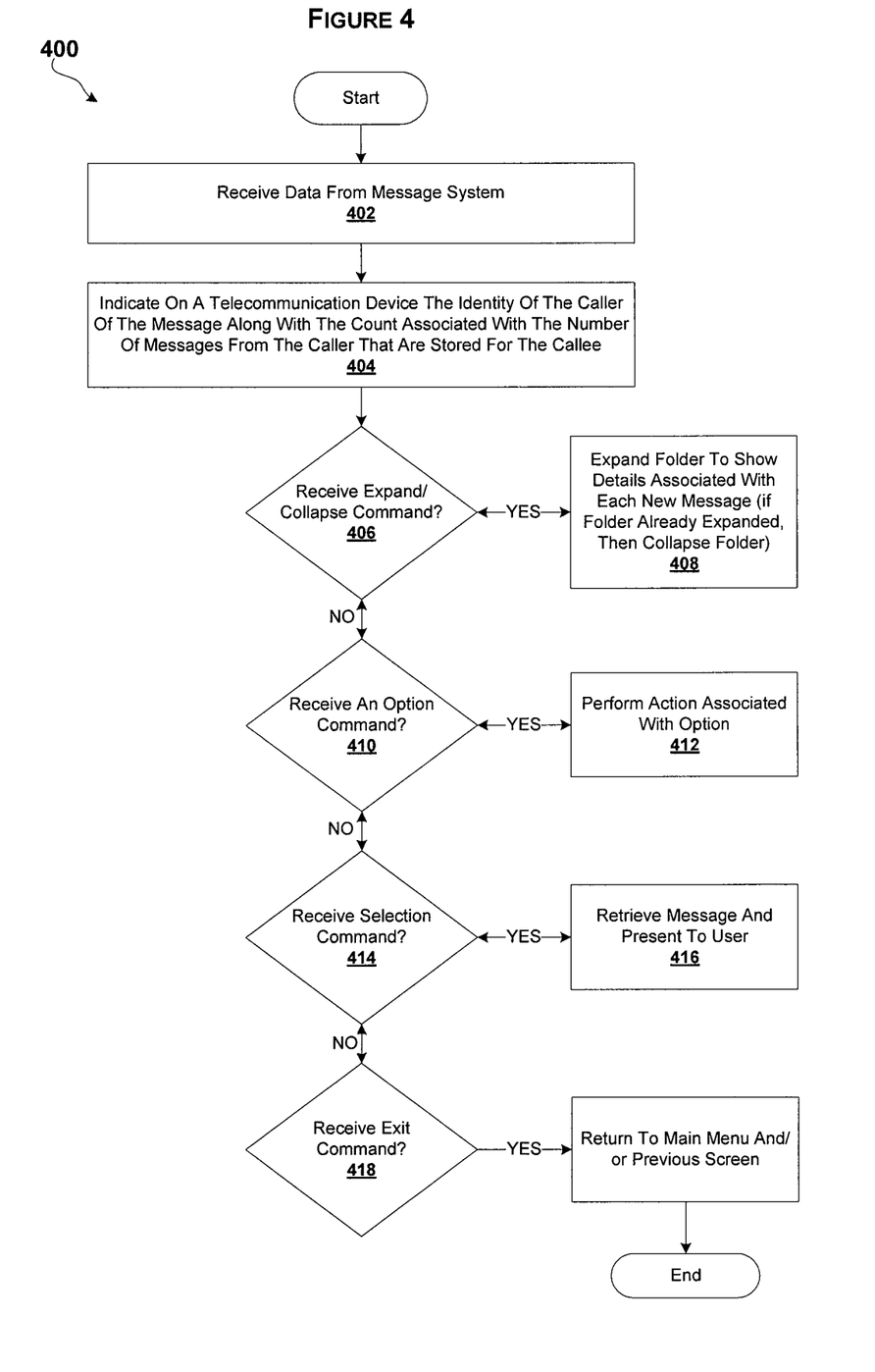
FIG. 4 depicts an embodiment of a process performed by a telecommunication device for managing messages.

FIG. 4 depicts an embodiment of a process 400 performed by a telecommunication device for managing messages. At step 402, the process receives data from the messaging system. Using the data, the process indicates, on a telecommunication device, the identity of the caller of the message along with the count associated with the number of messages from the caller that are stored for the callee, at step 404.

From this point, the process may receive a number of different commands from a user. For example, in one embodiment, the process may receive an expand/collapse command, at step 406, to expand a particular group of messages to display additional details, such as, but not limited to, the caller identification, time/date of call, and length of each message in the particular grouping of messages. In response to receiving an expand/collapse command, the process, at step 408, expands the selected folder/group of messages to show details associated with each message in the group. However, if the expand/collapse command is received while the group is already expanded, the process collapses the folder/group to hide the details of the individual messages.

The process may also receive one of a number of different option commands at step 410. For example, in some embodiments, the user may choose to retrieve, delete, download, and/or forward call messages associated with a particular group. In addition, in some embodiments, a user may select an option to call back a caller associated with a particular message and/or group of messages. In response to receiving one of the option commands, the process performs an action associated with the received option command at step 412.

Further, at any time, the process may receive a selection command at step 414 associated with a particular message and/or group of messages. In response to receiving a selection command, the process retrieves the particular message and/or group of messages and presents the message(s) to the user at step 416. For example, in one embodiment, in response to receiving a selection command, the process calls a voicemail system and passes the pointers to the desired message files. The voicemail system retrieves the message files associated with the pointers and plays the voicemails.

Additionally, at any time, the process may receive an exit command at step 418. In such a case, the process returns a main menu screen or, in some embodiments, to a prior menu and/or screen, with process 400 terminating thereafter.

Figure 5:
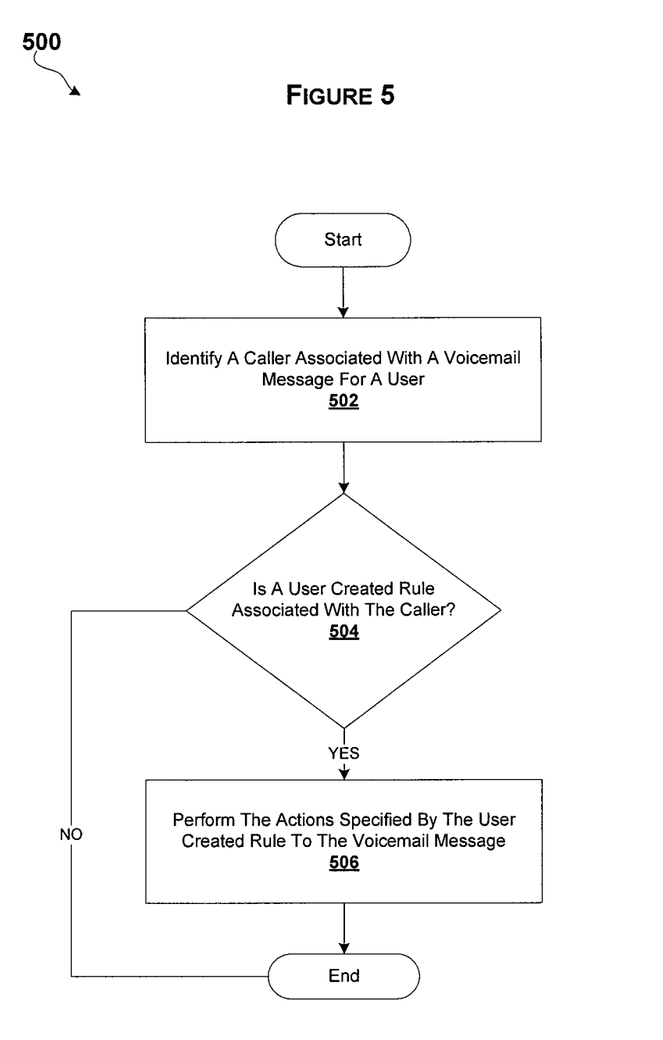
FIG. 5 depicts an embodiment of a process for managing messages using user created rules.

FIG. 5 depicts an embodiment of a process 500 for managing messages using user created rules. Process 500 begins by identifying a caller associated with a voicemail message for a user, at step 502. The process determines whether a user created rule is associated with the caller of the message at step 504. If a user created rule is not associated with the caller of the message, the process stores the message as usual and terminates process 500. However, if a user created rule is associated with the caller of the message, the process, at step 506, performs the actions specified by the user created rule to the voicemail message, with process 500 terminating thereafter.

Figure 6:
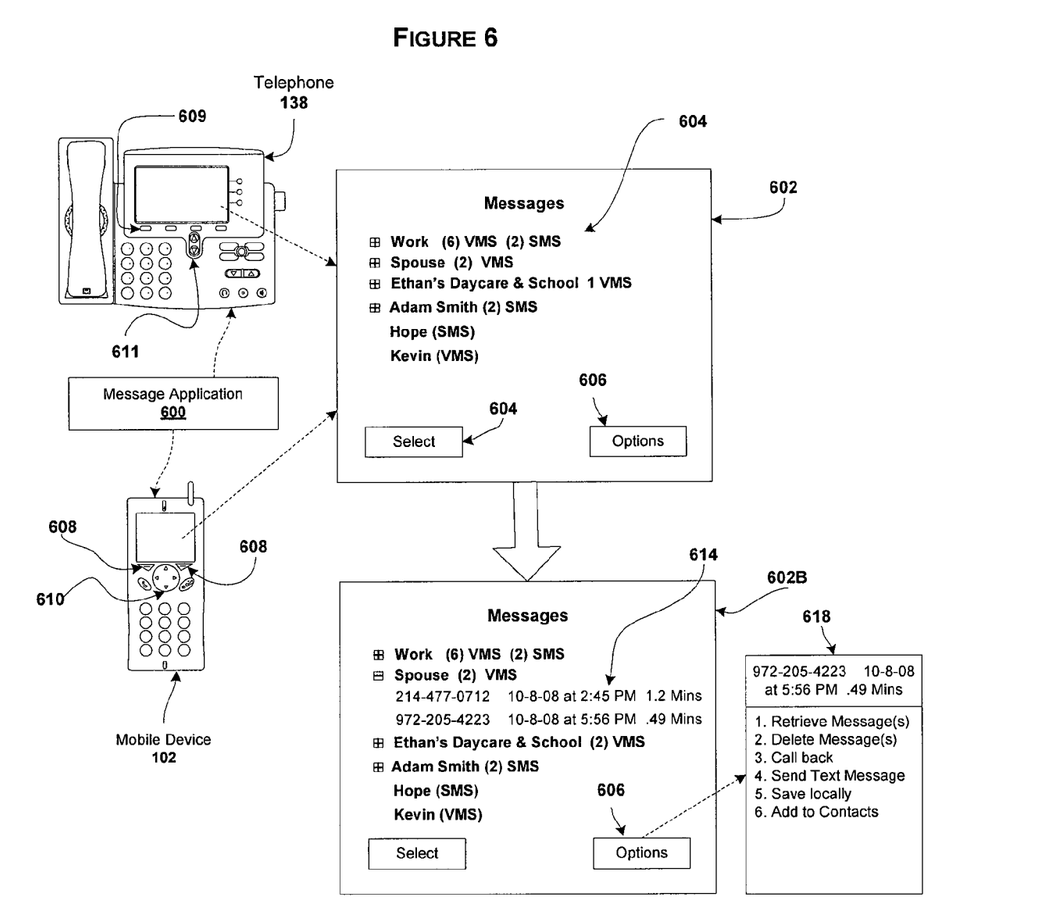
FIG. 6 depicts an embodiment of a user interface on a telecommunication device for managing messages.

With reference now to FIG. 6, an embodiment of a user interface 602 on a telecommunication device, such as, but not limited to, mobile device 102 and telephone 138, for managing messages is presented. As depicted in FIG. 6, mobile device 102 and telephone 138 executes message application 600 for managing messages. In some embodiments, message application 600 includes computer executable instructions for enabling a user to create/configure a user created rule to apply to received messages. Additionally, in some embodiments, message application 600 includes computer executable instructions for receiving data from a messaging system, such as, but not limited to, voicemail server 124, and interpreting the data to present user interface 602.

Further, in some embodiments, mobile device 102 and telephone 138 respectively includes buttons 610 and 611 for scrolling a list of messages 604 presented on user interface 602. In some embodiments, list of messages 604 comprises a list of all new messages, such as, but not limited to, voicemails and SMS messages that have been received for a particular user associated with mobile device 102 and/or telephone 138. However, in some embodiments, list of messages 604 may also include stored/saved messages.

In addition, in some embodiments, mobile device 102 and telephone 138 respectively includes buttons 608 and 609 for selecting feature/options associated with user interface 602. For example, in one embodiment, buttons 608 and 609 enable a user to select softkey 604 and/or softkey 606 for selecting features/options associated with user interface 602. Alternatively, in some embodiments, mobile device 102 and/or telephone 138 may include touch screen capabilities to enable to a user to directly push softkey 604 and/or softkey 606. In some embodiments, the features/options associated with softkey 604 and/or softkey 606 may change depending on the state of user interface 602.

In one embodiment, a user may select, using softkey 604 a particular group of messages to expand the group of messages to display additional details about the individual messages within the selected group. For example, user interface 602B depicts the Spouse message group expanded to display the details of two voicemail messages. In one embodiment, using softkey 604, the user retrieves the selected message and/or group of messages. Alternatively, in some embodiments, selecting softkey 606 may present a user interface 618 that includes a list of other options that a user may select from. For example, in some embodiments, the user may retrieve and/or delete a selected message and/or group of messages, place a voice call back to the caller, send a text message back to the caller, save a selected message and/or group of messages locally, and/or add the caller to a contacts list.

Accordingly, the disclosed embodiments present a more convenient method for managing and retrieving messages that improves upon both the standard method of calling a voicemail system and current visual voicemail implementations by automatically grouping messages from the same caller together and/or by applying user created rules to received messages. Thus, a user is able to identify important messages that a user desires to listen/view first more effeciently.

As will be appreciated by one skilled in the art, the disclosed embodiments may be embodied as a system, method, or computer program product. Accordingly, the disclosed embodiments may be implemented entirely with hardware or as a software embodiment (including firmware, resident software, micro-code, etc.) or an embodiment combining software and hardware aspects that may all generally be referred to herein as a "circuit," "module" or "system." Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed:

1. A method performed by a messaging system for managing messages, the method comprising:
identifying a caller associated with a message for a callee;
determining whether at least one other new message for the callee is from the caller;
responsive to the at least one other new message for the callee is from the caller, grouping the message with the at least one other new message;
placing the message and the at least one other new message in a folder associated with messages from the caller, wherein identifying the caller associated with the message for the callee includes identifying a particular geographical location associated with the caller and grouping all messages received from the caller with other messages identified as being from the particular geographical location; and
playing all messages in the folder in response to receiving a playback request of the folder.

2. The method of claim 1, wherein the message and at least one new stored message are different type messages, the different type messages including at least both a voicemail message and an SMS message.

3. The method of claim 1, wherein the message and at least one other new message are text messages.

4. The method of claim 1, further comprising incrementing a count associated with a number of new messages from the caller that are stored for the callee.

5. The method of claim 4, further comprising:
responsive to receiving a call from the callee, presenting an audible message indicating an identity of the caller of the message along with the count associated with the number of new messages from the caller that are stored for the callee.

6. The method of claim 1, further comprising presenting individual messages contained within a group of messages associated with a particular caller in response to receiving a user selection of the group of messages.

7. The method of claim 4, further comprising:
indicating, on a telecommunication device associated with the callee, the identity of the caller of the message along with the count associated with the number of messages from the caller that are stored for the callee.

8. The method of claim 7, further comprising displaying on the telecommunication device details, including duration of each new message, associated with each new message that is associated with the caller.

9. The method of claim 1, visually presenting a list of information associated with each of the messages in response to the folder being selected.

10. The method of claim 1, downloading all messages in the folder to a requesting device in response to receiving a download request of the folder.

11. The method of claim 1, forwarding all messages in the folder to a particular device in response to receiving a forward request of the folder.

12. The method of claim 1, wherein identifying the caller associated with the message for the callee includes comparing a call identifier associated with the caller using a user created rule, wherein the user created rule compares the call identifier to a partial string.

13. A messaging service apparatus comprising:
memory coupled to a processing unit, the memory includes computer usable program code; and the processing unit executes the computer usable program code to:
- identify a caller associated with a message for a callee;
- determine whether at least one other new message for the callee is from the caller;
- responsive to the at least one other new message for the callee is from the caller, associate the message with the at least one other new message;
- place the message and the at least one other new message in a folder associated with messages from the caller;
- identify a particular geographical location associated with the caller and group all messages received from the caller with other messages identified as being from the particular geographical location; and
- playing all messages in the folder in response to receiving a playback request of the folder.

14. The messaging service apparatus of claim 13, wherein the processing unit further executes the computer usable program code to present an audible message indicating an identity of the caller of the message along with a count associated with a number of new messages from the caller that are stored for the callee in response to receiving a call from the callee.

* * * * *